No. 631,886. Patented Aug. 29, 1899.
K. BAUM.
APPARATUS FOR IMPREGNATING MEAT.
(Application filed June 25, 1898.)
(No Model.)
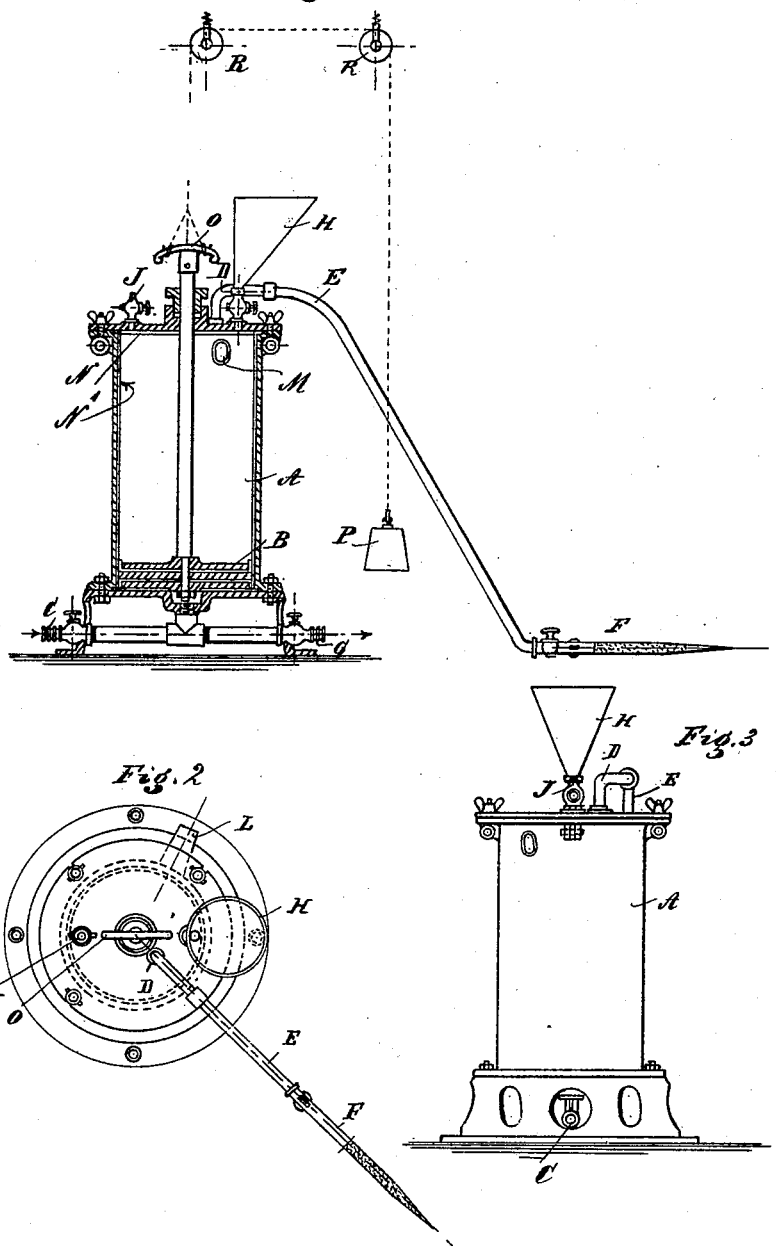

UNITED STATES PATENT OFFICE.

KARL BAUM, OF MANNHEIM, GERMANY.

APPARATUS FOR IMPREGNATING MEAT.

SPECIFICATION forming part of Letters Patent No. 631,886, dated August 29, 1899.

Application filed June 25, 1898. Serial No. 684,495. (No model.)

*To all whom it may concern:*

Be it known that I, KARL BAUM, a subject of the Emperor of Germany, and a resident of Mannheim, Empire of Germany, have invented a certain new and Improved Apparatus for Impregnating Meat, of which the following is a full, clear, and exact description.

The present invention relates to an apparatus for impregnating and pickling meat; and it consists of the details of construction hereinafter set forth, and particularly pointed out in the claim.

In order to render the present specification more easily intelligible, reference is had to the accompanying drawings, in which similar letters of reference denote similar parts throughout the several views.

Figure 1 is a vertical section through the apparatus; Fig. 2 a plan, and Fig. 3 an elevation, of the same.

The apparatus consists of a cylinder A, having a piston B therein, with rod extending out of the cylinder and provided with a handle O. The upper cylinder-cover is provided with a vent-cock J and a pipe D, having thereon a tube E, to the end of which is attached the jet or needle F, of hard rubber, and having a stop-cock, as shown. The top cover is further provided with an inlet-hopper H for the impregnating mass, said hopper having also a cock at the bottom. The lower end of the cylinder is in communication by means of a cock C with the water-supply, G being the water-outlet cock.

The apparatus is manipulated in the following manner for impregnating meat: The impregnating medium is filled into the cylinder above the piston through the hopper H, and the cock of the latter then closed, the vent J having been open the while. The vent is then closed and the cock C from the water-supply opened, the cock G being closed. Thus the piston will be raised by the water-pressure and force the impregnating medium through the pipe D and tube E to the needle F. As soon as the medium commences to exude through the orifices of the needle-head F the latter is inserted in the meat in the direction of the fibers in the well-known manner and the meat thus impregnated. If it is desired to raise the piston by a weight instead of water-pressure, a cord or wire is attached to the piston and guided over suitable rolls R R and a weight P, suspended thereon.

When working with the weight, the cock C should be closed and the cock G opened, the latter then operating as a vent. If desired, both water and weight pressure may be exerted by turning on the water-cock and closing the cock G.

In order to utilize the apparatus for making sausages, the upper part of the cylinder is provided with a nozzle L, which is covered by a plate M when the apparatus is used for impregnating purposes, the said nozzle serving to receive the skin or gut. A thin plate-covering N is inserted between the end of the cylinder and the cover, which latter is removed for the purpose, the said plate serving to cover the orifices leading to the vent J and the hopper H, when the apparatus is to be used for making sausages. The meat is now filled into the cylinder and the plate N and cover attached thereto, the water turned on, and the meat forced through the nozzle L into the skin or gut in the well-known manner. In this case also the apparatus may be operated by water or weight pressure, or both, as will be readily understood. The interior of the cylinder is covered by a lining of suitable material N', which will resist the formation of rust and verdigris. The cylinder-covers are tightly closed by rubber disks. All parts of the apparatus liable to come into contact with the impregnating mass are made of or covered with materials which will resist the formation of rust and verdigris.

I claim as my invention—

An apparatus for impregnating meat, composed of a cylinder, a piston movable therein, a charging-hopper, a vent, and an impregnating-needle communicating with the cylinder, cocks that control the charging and vent openings, and a water-ingress cock below the piston, substantially as specified.

In witness whereof I have hereunto set my hand in presence of two witnesses.

KARL BAUM.

Witnesses:
JACOB ADRIAN,
MATTHIAS SCHOENMETZER.